Aug. 9, 1949.   R. H. CARSON   2,478,237
OPTICAL PROJECTION AND PLOTTING TABLE
DEVICE FOR NAVIGATION DATA
Filed April 18, 1945   2 Sheets-Sheet 1

Inventor:
Robert H. Carson
by William D. Hall.
Attorney

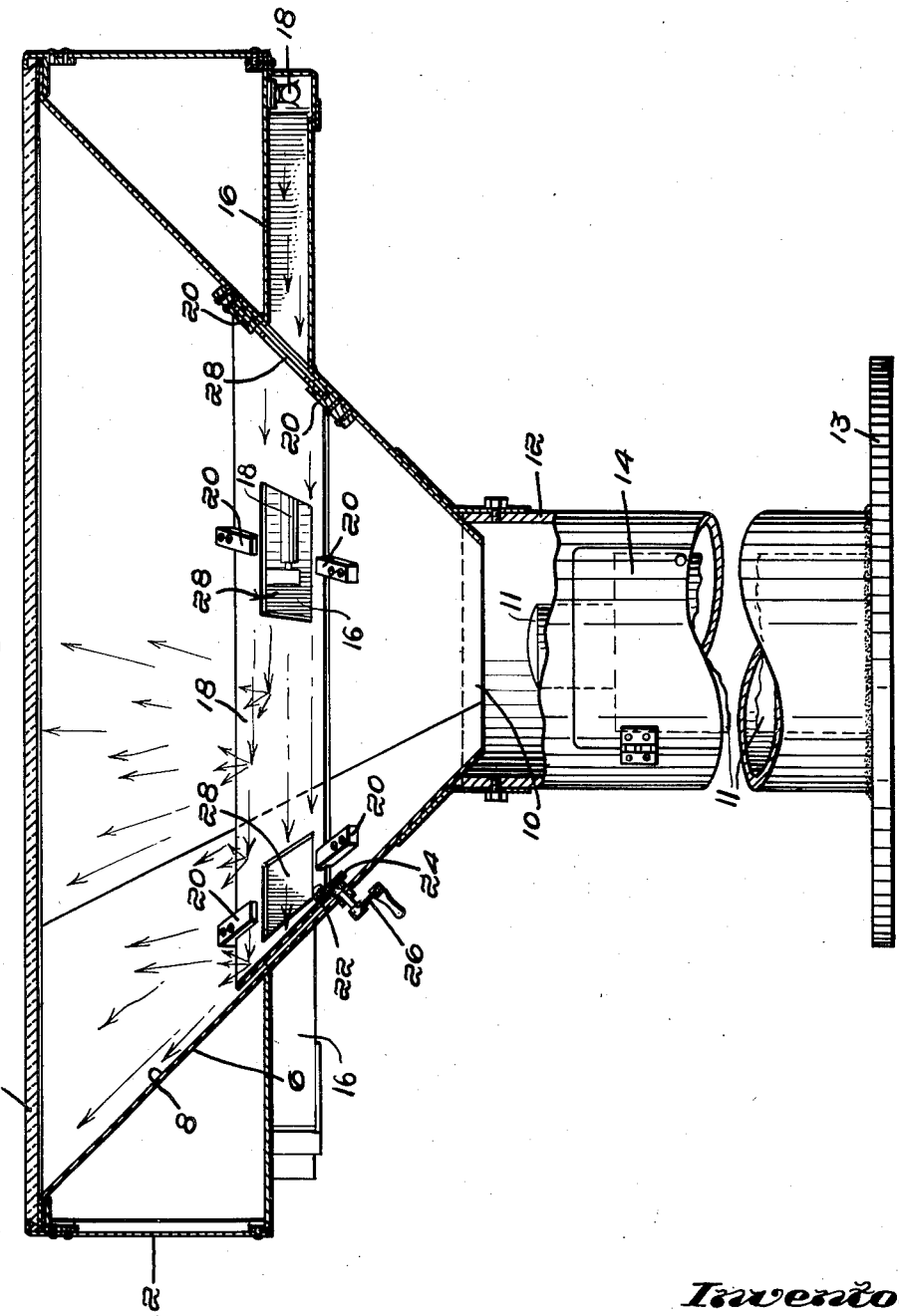

Patented Aug. 9, 1949

2,478,237

UNITED STATES PATENT OFFICE 2,478,237

OPTICAL PROJECTION AND PLOTTING TABLE DEVICE FOR NAVIGATION DATA

Robert H. Carson, Arlington, Mass., assignor to the United States of America as represented by the Executive Secretary of the Office of Scientific Research and Development Application April 18, 1945, Serial No. 588,983

4 Claims. (Cl. 88—24)

This invention relates to illuminated working surfaces and more especially to a horizontal plotting table for optical projection of navigation data.

In the plotting of data pertaining to navigation, there are now employed beam or image-projecting devices which require a low level of ambient light intensity for good visibility—that is, to allow effective perception of the projected image or beam—and as a result, it is a common practice to resort to a darkened room. This arrangement is also desirable for the reason that personnel are frequently required to look successively at the screen of a cathode ray tube and then a plotting or display board. To render such an operation most efficient, it is desirable to avoid the requirement that the observer shall re-accommodate his vision to different levels of illumination each time he glances from the plotting device to a nearby object, which might include some accessory or instrument related to a computation or compilation being carried out.

An object of the invention is to provide an improved plotting table and to devise a display device with a plot plate having a uniform ground illumination from within, in addition to—and lower than—any data or image projected by the projection apparatus, so as to permit room light intensity to be low and yet not interfere with the visibility of displayed data or the observation of projected images on sensitized or translucent surfaces. Other objects of the invention will appear from the following description.

In the accompanying drawings:

Fig. 2 is a vertical cross section taken on the line 2—2.

Figure 1:
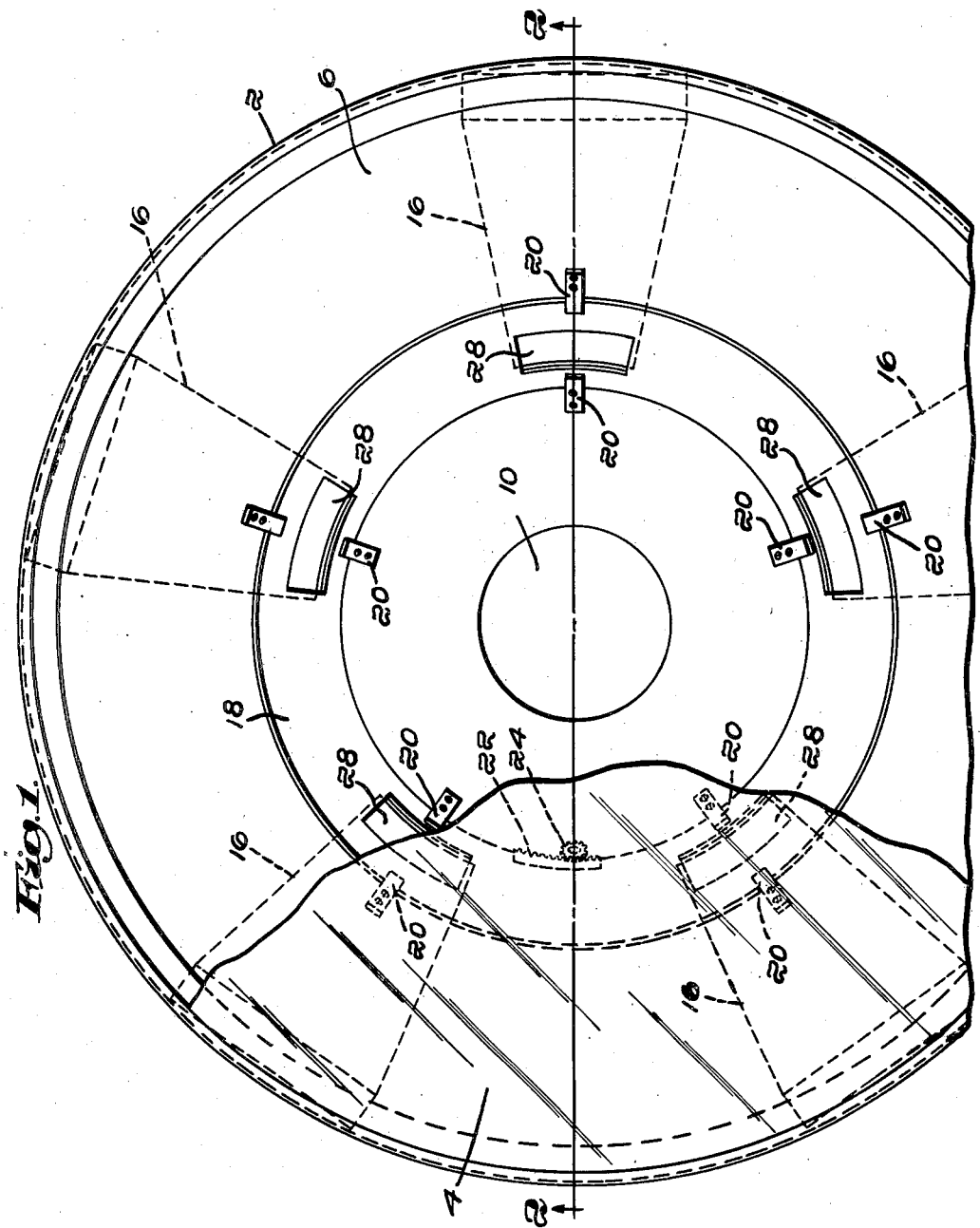
Fig. 1 is a plan view illustrating the plotting table of the invention.

Referring more in detail to the drawings, numeral 2 denotes a cylindrical member of hollow construction, covered at its upper side with a circular plate 4 of translucent material such as glass, plastic, and the like, with an upper surface suitably constituted to serve as a plotting surface and to be illuminated as a luminous field. Fastened at the inner upper edges of the cylindrical member 2 is a cone 6 which is preferably formed of a thin material such as sheet material, and which has an inner surface 8 preferably covered with a flat white paint or other covering material of suitable character to provide for diffusion of light.

At its lower end the cone terminates in an opening 10 and is mounted in a pedestal 12, in turn received on a base 13. A door 14 furnishes access to the interior of the pedestal 12 and in use a light source 11, of the type commonly referred to as a "point source projector" is located in the pedestal 12 at a point just below the opening 10 in the cone. The point source projector serves to project an image on the glass plate 4.

Connecting with the interior of the cone 6 and extending radially of the cylindrical member 2 are a plurality of tubular portions 16, at the outer ends of which are mounted lighting means 18. The tubular members when illuminated by the lighting means 18 provide beams of light which are directed against those portions of the cone surface lying directly across from respective tubular portions. From these illuminated areas on the flat white surface of the cone, light is diffused so as to uniformly illuminate the glass plate 4. In this way, indirect illumination of the glass plotting surface is secured.

The intensity of illumination afforded by the tubular means 16 is controlled and limited by means of a frusto cone-shaped shutter 18' which is rotatably supported in the cone in brackets 20. Numeral 22 refers to a rack fixed to the shutter. The rack is meshed with a gear 24 operated by a handle 26. The shutter is formed with openings 28 which are aligned with, and generally correspond in shape with, the ends of the tubular portions 16, and by rotating the shutter, the size of the opening can be decreased as desired without interfering with images or beam projected from apparatus in the pedestal.

It will be seen that I have provided a simple, easily operated and efficient plotting table in which indirect lighting is furnished with a suitable controlling apparatus while permitting the use of a point source projector necessary in projecting data on a glass plotting surface. The effect of the several beams of light indirectly employed is completely adequate for illuminating purposes, and is characterized by softness and lack of glare which makes it ideally suited for carrying out extended plotting operations, during which the operator is required to look directly down upon the plotting table. The intensity of the diffused light may be reduced very gradually to a point where substantially no interference with other apparatus occurs and the dark adaptation of the operator may be preserved during its use.

While I have shown a preferred embodiment of my invention; therefore it is intended that various modifications and changes may be resorted to in keeping with the scope of the invention as defined by the appended claims.

Having thus described my invention, what I claim is:

1. An article of the character described comprising a base, a pedestal member fixed to the base and having projecting means mounted therein, a cone supported in the pedestal in spaced-apart relation with respect to the said projector, a cylindrical member attached around the upper outer peripheral edges of the cone, tubular means formed in the cylindrical member connecting with the space within the cone, lighting means located at the outer extremities of the tubular portions, shutter means adjustably secured within the cone and adapted to open and close the tubular openings, a translucent plotting and projection plate mounted at the top of the cylindrical member, said plate adapted to receive projected subject matter from said projecting means and adapted to be indirectly illuminated by light from the said illuminating means in the tubular portions.

2. An article of the character described comprising a base, projection means located in the base, a light reflecting inverted cone member fixed to the base concentric with and around the projection means and positioned without the zone of light rays projected from the projection means, a translucent plate mounted on the upper edge of the cone, means for illuminating the inner surface of the cone from a source without the cone member so that a low level uniform illumination of said plate will be reflected from said cone, and means to shield said translucent plate from said source, said plate being constructed to serve as a plotting surface.

3. A device of the class described, comprising a base, an image projection means located in said base, a member supported upon said base having an inner annular light diffusing surface thereon concentric with the axis of said projection means and subtending a plane across the outer end of the device normal to said axis, a translucent plotting surface mounted upon said member, and means for illuminating said light diffusing surface, said illuminating means being located without a zone in space coextensive with and extending from said image projecting means to said plotting surface and shielded from said plotting surface so that said translucent plotting surface is indirectly lighted from said illuminating means solely by reflection directly from said light diffusing surface whereby there is produced a low level illumination below that of the image projected by said image projecting means.

4. A projector comprising a base, a tubular pedestal member fixed to said base and having light ray projecting means mounted therein directed axially in the pedestal, a hollow truncated conical member inverted and having its smaller end supported in said pedestal and in concentric spaced apart relation with respect to a conical zone for rays from said projection means, said conical member including a light scattering inner surface, tubular members mounted on the outside of said conical member generally radial in relation to the axis of said conical member opening therethrough and each containing an illuminating means at the outer part thereof, a translucent plotting and projection plate mounted at the top of said conical member, normal to said axis, and spaced from the open ends of said tubular members in a relation to be uniformly illuminated by light reflected from said light scattering surface.

ROBERT H. CARSON.

REFERENCES CITED

The following references are of record in the file of this patent:

UNITED STATES PATENTS

| Number | Name | Date |
| --- | --- | --- |
| 1,166,384 | Partridge et al. | Dec. 28, 1915 |
| 1,228,685 | Magowan | June 5, 1917 |
| 1,306,861 | Sparkes | June 17, 1919 |
| 1,372,017 | Grant et al. | Mar. 22, 1921 |
| 1,418,157 | Michelson | May 30, 1922 |
| 1,433,877 | Exton | Oct. 31, 1922 |
| 1,705,951 | Wright | Mar. 19, 1929 |
| 2,090,270 | Swanson | Aug. 17, 1937 |
| 2,131,952 | House | Oct. 4, 1938 |

FOREIGN PATENTS

| Number | Country | Date |
| --- | --- | --- |
| 112,823 | Austria | Apr. 10, 1929 |